(12) United States Patent  (10) Patent No.: US 7,517,179 B2
Miller et al.  (45) Date of Patent: Apr. 14, 2009

(54) SMALL HOLESAW MANDREL ASSEMBLY

(75) Inventors: Mark D. Miller, Airville, PA (US);
Rickey J. Thomas, Lineboro, MD (US)

(73) Assignee: Black & Decker Inc., Newark, DE (US)

( * ) Notice: Subject to any disclaimer, the term of this patent is extended or adjusted under 35 U.S.C. 154(b) by 76 days.

(21) Appl. No.: 11/600,541

(22) Filed: Nov. 16, 2006

(65) Prior Publication Data

US 2008/0118316 A1 May 22, 2008

(51) Int. Cl.
*B23B 51/04* (2006.01)

(52) U.S. Cl. .................. 408/204; 192/93 C; 403/348; 408/239 R

(58) Field of Classification Search ................ 408/204, 408/205, 206, 207, 208, 209, 238, 239 R, 408/240, 139, 140; 279/7, 8, 141; 403/348, 403/349; 192/93 C, 54.52
See application file for complete search history.

(56) References Cited

U.S. PATENT DOCUMENTS

| 2,556,155 | A |   | 6/1951  | Stellin      |        |
|-----------|---|---|---------|--------------|--------|
| 2,674,026 | A |   | 4/1954  | St. Palley   |        |
| 2,826,231 | A |   | 3/1958  | Alden        |        |
| 2,917,975 | A | * | 12/1959 | Webster      | 407/48 |
| 3,262,474 | A |   | 7/1966  | Enders       |        |
| 3,267,975 | A |   | 8/1966  | Enders       |        |
| 3,424,212 | A |   | 1/1969  | Kemper       |        |
| 3,456,548 | A |   | 7/1969  | Schmidt et al.|       |
| 3,784,316 | A |   | 1/1974  | Bittern      |        |
| 3,854,840 | A |   | 12/1974 | Miyanaga     |        |
| 3,970,407 | A |   | 7/1976  | Uffman       |        |
| 4,148,593 | A |   | 4/1979  | Clark        |        |
| 4,461,195 | A |   | 7/1984  | Barnick      |        |
| 5,108,235 | A |   | 4/1992  | Czyzewski    |        |
| 5,154,552 | A |   | 10/1992 | Koetsch      |        |
| 5,175,963 | A | * | 1/1993  | Schafer et al.| 451/342 |
| 5,226,762 | A |   | 7/1993  | Ecker        |        |
| 5,246,317 | A |   | 9/1993  | Koetsch et al.|       |
| 5,352,071 | A |   | 10/1994 | Cochran et al.|       |
| 5,597,274 | A |   | 1/1997  | Behner       |        |
| 5,624,213 | A |   | 4/1997  | Anderson     |        |
| 5,658,102 | A |   | 8/1997  | Gale         |        |
| 5,690,452 | A |   | 11/1997 | Baublits     |        |
| 5,868,532 | A |   | 2/1999  | Spenser      |        |
| 5,921,562 | A |   | 7/1999  | Robison      |        |
| 5,967,709 | A |   | 10/1999 | Thuesen      |        |
| 6,071,219 | A |   | 6/2000  | Cook         |        |

(Continued)

FOREIGN PATENT DOCUMENTS

DE  1 992 344  8/1968

(Continued)

*Primary Examiner*—Daniel W Howell
(74) *Attorney, Agent, or Firm*—Harness, Dickey & Pierce, P.L.C.

(57) ABSTRACT

A holesaw mandrel assembly has a mandrel with a first shanking end, a body, and a second extending end which includes a threaded spud to receive a holesaw. A first member is secured on the second end. The first member is axially slidable on the second end. The first member also includes a friction surface to contact the holesaw. The friction surface moves between a first contacting position and a second release position. A mechanism on the mandrel moves the friction surface between the first and second positions.

28 Claims, 9 Drawing Sheets

U.S. PATENT DOCUMENTS

| | | | |
|---|---|---|---|
| 6,120,221 | A | 9/2000 | Alm |
| 6,302,409 | B1 | 10/2001 | Gutsche |
| 6,357,973 | B2 | 3/2002 | Chao |
| 6,623,220 | B2 | 9/2003 | Nuss et al. |
| 6,682,283 | B2 | 1/2004 | Mann et al. |
| 6,887,018 | B2 * | 5/2005 | Ostermeier ............... 408/204 |
| 6,939,092 | B2 | 9/2005 | Korb et al. |
| 7,073,992 | B2 | 7/2006 | Korb et al. |
| 2001/0001276 | A1 | 5/2001 | Chao |
| 2005/0025591 | A1 | 2/2005 | Korb et al. |

FOREIGN PATENT DOCUMENTS

| | | |
|---|---|---|
| DE | 74 30 652 | 12/1974 |
| DE | 2624370 | 4/1980 |
| DE | 295 09 238 | 9/1995 |
| DE | 299 17 867 | 4/2000 |
| EP | 0 235 581 | 10/1989 |
| EP | 0 732 164 | 8/1999 |
| EP | 0 811 449 | 7/2001 |
| EP | 0 776 721 | 11/2002 |
| EP | 1 193 014 | 7/2004 |
| EP | 1 447 195 | 8/2005 |
| GB | 2257381 | 1/1993 |
| GB | 2295110 | 5/1996 |
| WO | WO 97/49516 | 12/1997 |
| WO | WO 98/26890 | 6/1998 |
| WO | WO 01/38028 | 5/2001 |
| WO | WO 2004/085104 | 10/2004 |
| WO | WO 2005/000506 | 1/2005 |
| WO | WO 2005/120754 | 12/2005 |

* cited by examiner

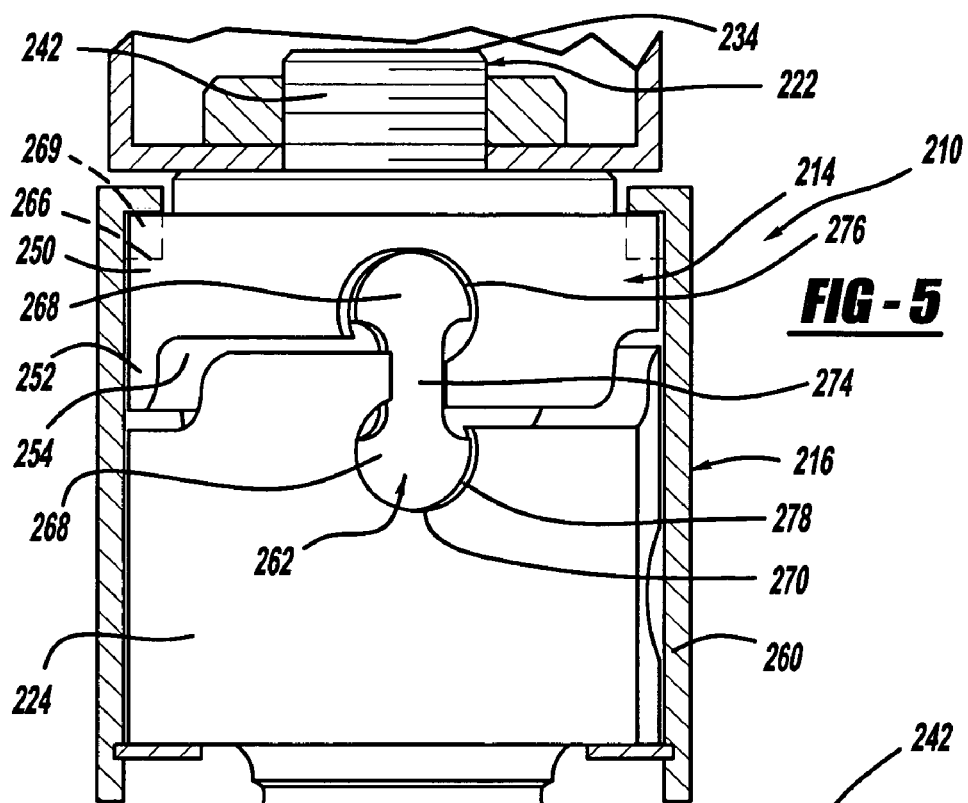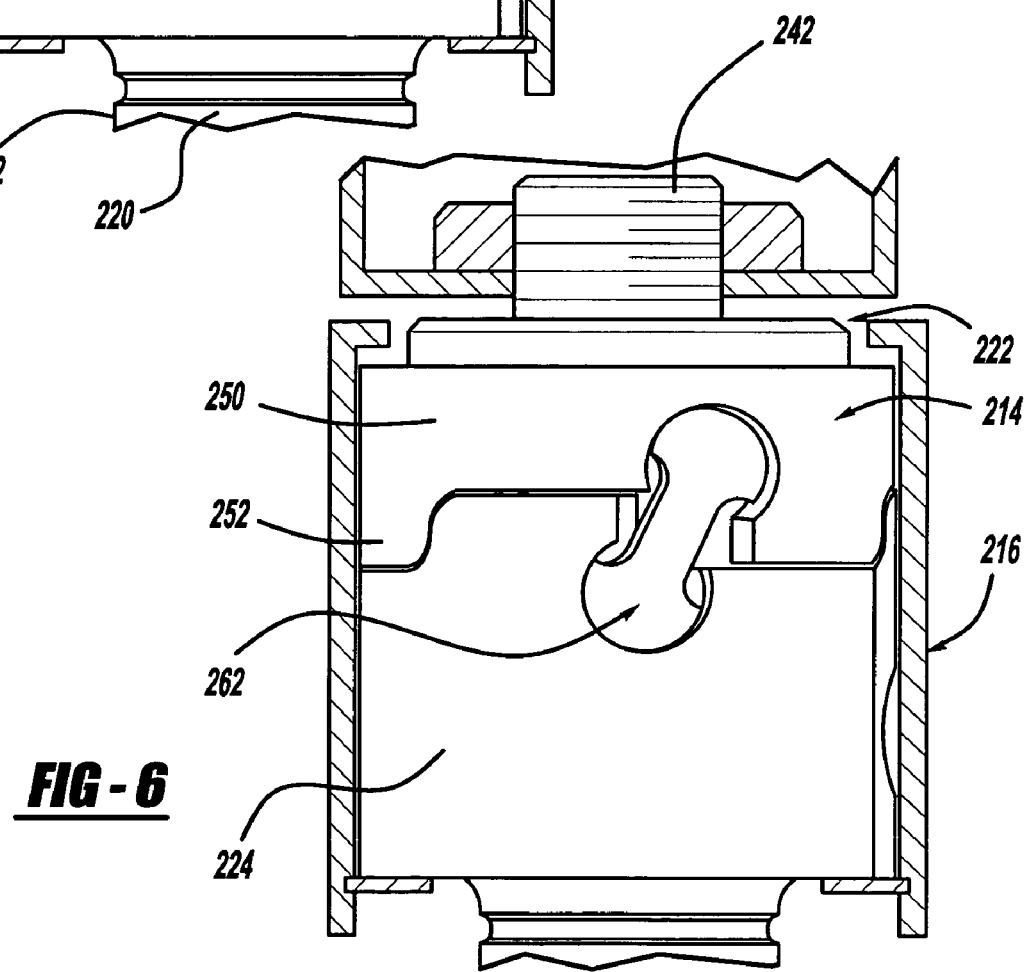

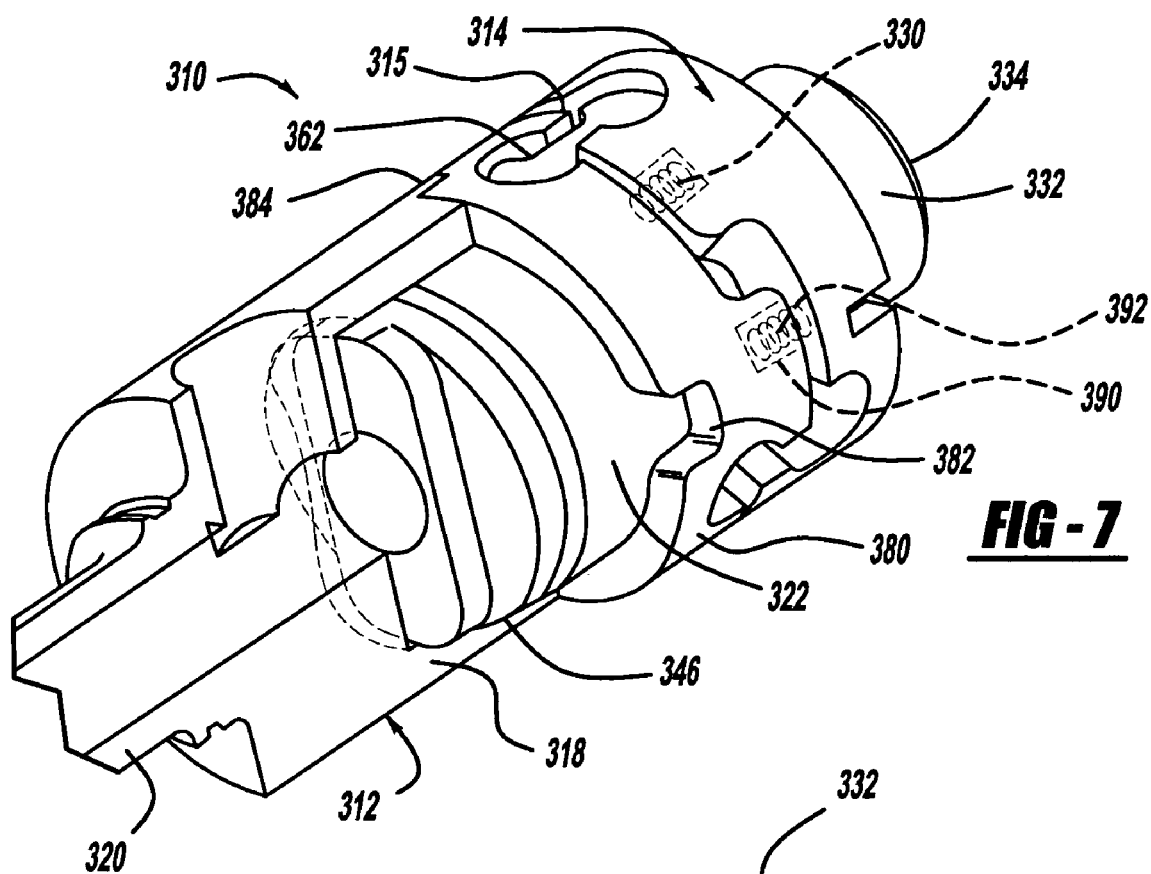
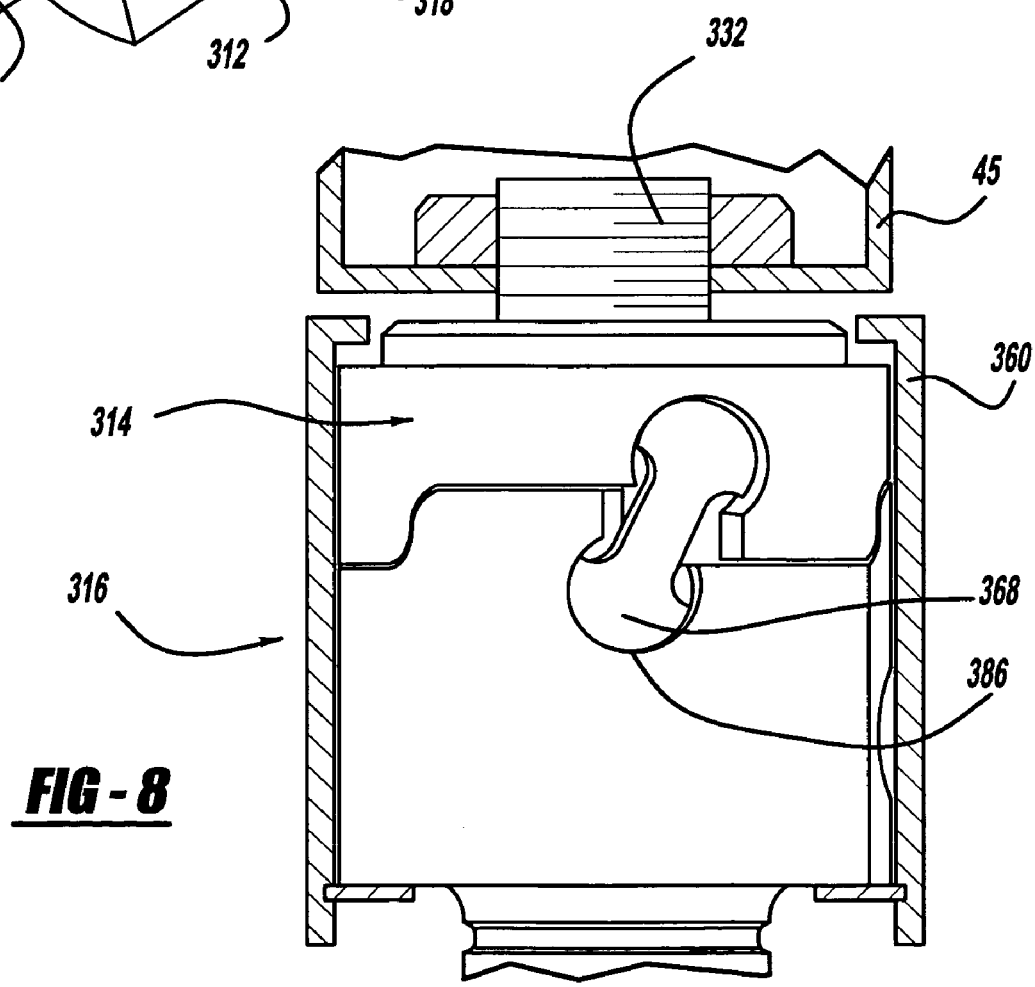

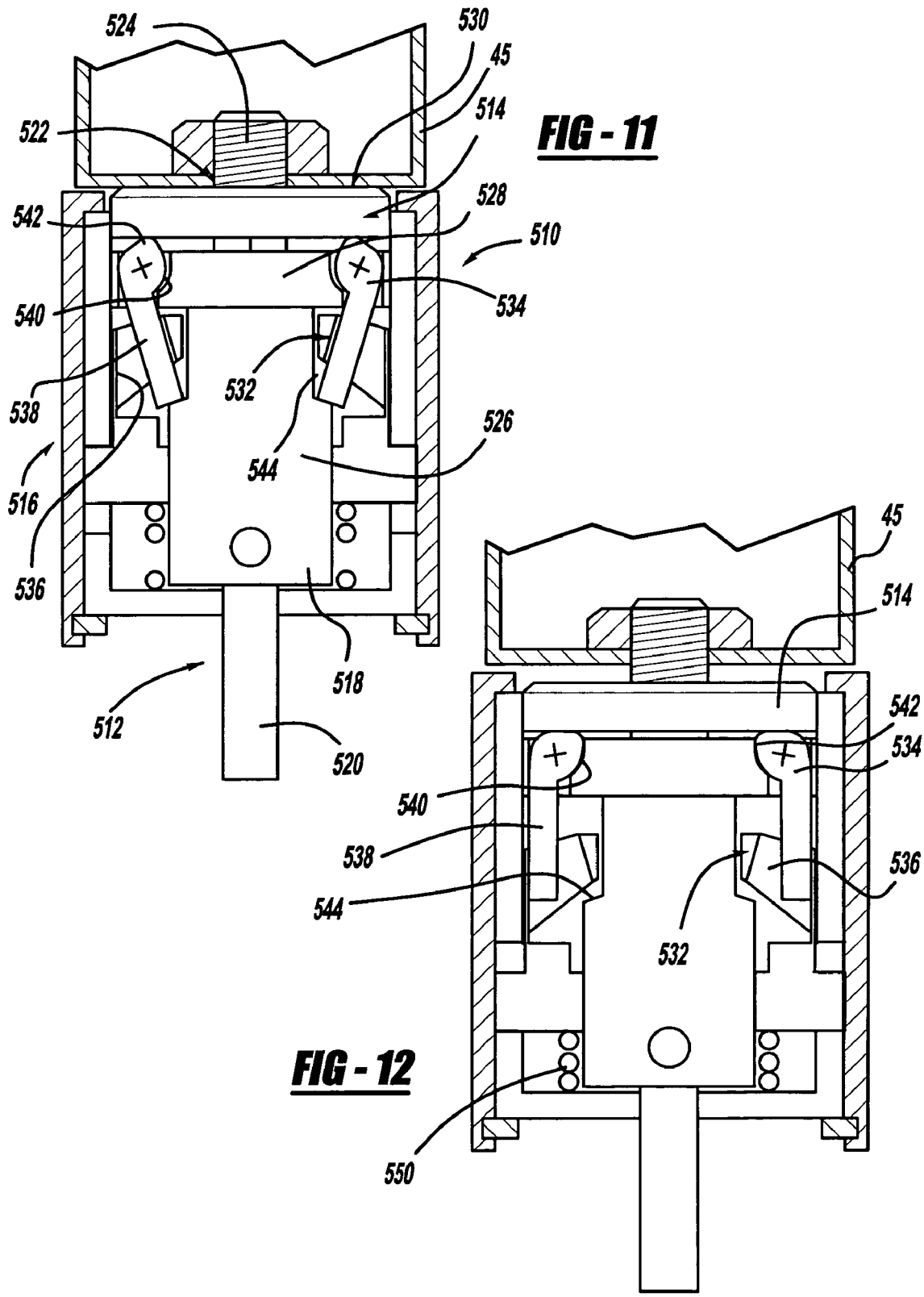

SMALL HOLESAW MANDREL ASSEMBLY

FIELD

The present disclosure relates to holesaws and, more particularly, a mandrel assembly for receiving holesaws.

BACKGROUND

Various types of holesaw mandrel assemblies exist in the art. The assemblies are concerned with quick release device in order to readily remove the holesaw from the mandrel assembly after use. Various types of mechanisms have been utilized in order to secure the holesaw onto the mandrel assembly, all of which enable the holesaw to be removed. Some of these mandrel assemblies utilize pins or the like which fit into the base of the holesaw. The pins hold the holesaw in position during rotation and cutting. However, since the holesaw is not torqued down onto the collar adjacent the threaded spud, the pins can be removed from the base of the holesaw and the holesaw can be easily rotated and removed from the threaded spud.

When small diameter holesaws are utilized, the base of the holesaw does not includes holes to receive the pins on the mandrel assemblies. This is due to the fact that the diameter of the base is too small to register with the pins. Also, during use, due to the threaded engagement of the spud with the small holesaw, the holesaw is torqued down onto the collar of the mandrel assembly. Accordingly, a wrench or the like is required to loosen the holesaw from the mandrel collar in order to remove the holesaw from the mandrel assembly. The art does not provide a small holesaw mandrel which enables the user to quickly remove, by hand, the holesaw from the mandrel assembly. Thus, it is desirable to have a mandrel assembly which enables a quick release of small diameter holesaws.

SUMMARY

The present disclosure provides the art with a holesaw mandrel assembly which enables a quick release of small holesaws from the mandrel assembly. The present holesaw mandrel assembly provides a friction face that abuts the holesaw. The friction face axially moves away from holesaw into a released position. The holesaw assembly enables the friction face to be automatically moved back to its original position.

According to a first aspect of the disclosure, a holesaw mandrel assembly comprises a mandrel having a body with a first end to couple with a drill motor. A second end extends from the body. The second end includes a threaded spud to receive a holesaw. The second end may also include a bore to receive a pilot bit. A first member is on the second end. The first member is axially movable on the second end. A friction surface is on the first member. The friction surface is adapted to contact a base surface of the holesaw to fix the holesaw in position. The friction surface moves between a first contact and a second release position. A mechanism is on the mandrel adjacent the first member. The mechanism moves the friction surface between the first and second positions. The first member is biased to return to its first position from its second position. The mechanism further comprises a second member rotatable on the second end. The second member provides a bearing surface. At least one roller is positioned between the first and second member. The roller is on the bearing surface. The roller may have an elongated body defining an axis with a substantially cylindrical surface resting on the bearing surface. Rotation of the first or second member moves the roller such that the roller moves from a position wherein the body axis is substantially parallel to an axis of the bore to a position wherein the axis is angled with respect to the bore axis which, in turn, moves the first member between the first and second positions. The mechanism may include at least one seal as well as a cage for maintaining the roller in position. The roller may have a dog bone shape. Also, the roller may be a ball with the bearing surface including at least one groove. Also, the first member may be rotational fixed to the mandrel.

According to a second aspect of the disclosure, a holesaw mandrel assembly comprises a mandrel having a body with a first end and a second end. The first end is coupled with a drill motor. The second end extends from the body. The second end includes a threaded spud and a bore to receive a pilot drill bit. A first member is positioned on the second end. The first member is axially movable on the second end. A second member is positioned on the second end adjacent the first member. The second member is rotatable on the second end. The second member provides a contact surface. At least one roller extends between the first and second members. The at least one roller is in contact with the contact surface of the second member. The roller moves between a first and second position to enable the first member to move axially along the second end. When the roller is in its first position, the first member is fixed so that a holesaw may be screwed onto the threaded spud. The holesaw abuts the first member to lock the holesaw in a used position on the first member. When the roller is moved to a second position, the first member moves axially away from the holesaw along the second end to enable the holesaw to be easily removed from the threaded spud. A thrust bearing is adjacent the second member to provide a substantially friction free rotation of the second member. A biasing mechanism moves the roller from its second position to its first position. A cover member is rotatable on the second end. The cover is keyed for rotation with the second member. A cage member retains the biasing mechanism as well as the roller in position. The cage includes an extending finger while the first member includes a projecting finger to form a channel between the two to receive the first biasing member and to maintain the roller in the channel. The cage is keyed with the cover member to rotate with the cover during rotation. The roller includes a substantially cylindrical surface to provide rolling movement. The cylindrical surface is in contact with the first and second members.

According to a third aspect of the disclosure, a holesaw mandrel assembly comprises a mandrel having a body with a first end to couple with the drill motor. A second end extends from the body. The second end includes a threaded spud to receive a holesaw. A first member is on the second end. A first member is axially movable on the second end. A second member is on the body. The second member provides a contact surface. At least one roller extends between the first and second members. The at least one roller is in contact with the second member contact surface. The at least one roller moves between a first and second position to enable the first member to move axially along the second end. When the at least one roller is in a first position, the first member is fixed so that the holesaw may be screwed onto the threaded spud and abut the first member to secure the holesaw in a used position on the first member. When the at least one roller is moved into its second position, the second member moves axially away from the holesaw enabling the holesaw to be easily removed from the threaded spud. The mandrel's second end rotates with respect to the mandrel body. The first member rotates with respect to the mandrel's second end. The at least one roller is dog bone shaped.

According to a fourth aspect of the disclosure, a holesaw mandrel assembly comprises a mandrel having a body with a first end to couple with the drill motor. A second end extends from the body. The second end includes a threaded spud to receive a holesaw. A first member is on the second end. The first member is axially immovable on the second end. A second member is axially movable on the mandrel body. At least one roller extends between the first member and the second member. The at least one roller is in contact with the second member contact surface. The at least one roller moves between a first and second position to enable the first member to move axially along the second end. When the at least one roller is in a first position, the first member is fixed so that the holesaw may be screwed onto the threaded spud and abut the first member to secure the holesaw in a used position on the first member. When the at least one roller is moved into its second position, the first member moves axially away from the holesaw to enable the holesaw to be easily removed from the threaded spud. The at least one roller is a pawl with a head and a leg. The head includes an eccentric cam surface. The mandrel body includes cutouts to receive the legs of the pawl. The mandrel body includes apertures to receive the pawl heads.

In accordance with a fifth aspect of the disclosure, a holesaw mandrel assembly comprises a mandrel having a body with a first end to couple with the drill motor. A second end extends from the body. The second end includes a threaded spud to receive a holesaw. A first member is on the second end. The first member axially moves on the second end. The second member is axially movable on the mandrel body. A groove is formed in the mandrel body. A pin is mounted on the second member. The pin engages the mandrel groove. The pin is movable between a first and second position to enable the first member to move axially along the second end. When the pin is in a first position in the groove, the first member is fixed so that the holesaw may be screwed onto the threaded spud and tighten on the first member to secure the holesaw in a used position on the first member. When the pin is moved into its second position in the groove, the first and second members move axially away from the holesaw enabling the holesaw to be easily removed from the threaded spud. The pin includes a cutout portion to engage the groove. The pin is biased in the second member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 5 is a cross-section view of an additional embodiment of the holesaw mandrel assembly;

FIG. 6 is a view like FIG. 5 in a second position;

FIG. 7 is a cross-section view of an additional embodiment of the holesaw mandrel assembly;

FIG. 8 is a view like FIG. 7 in a second position;

FIG. 11 is a cross-section view of an additional embodiment of the holesaw mandrel assembly;

FIG. 12 is a view like FIG. 11 in a second position;

DETAILED DESCRIPTION

Figure 1:
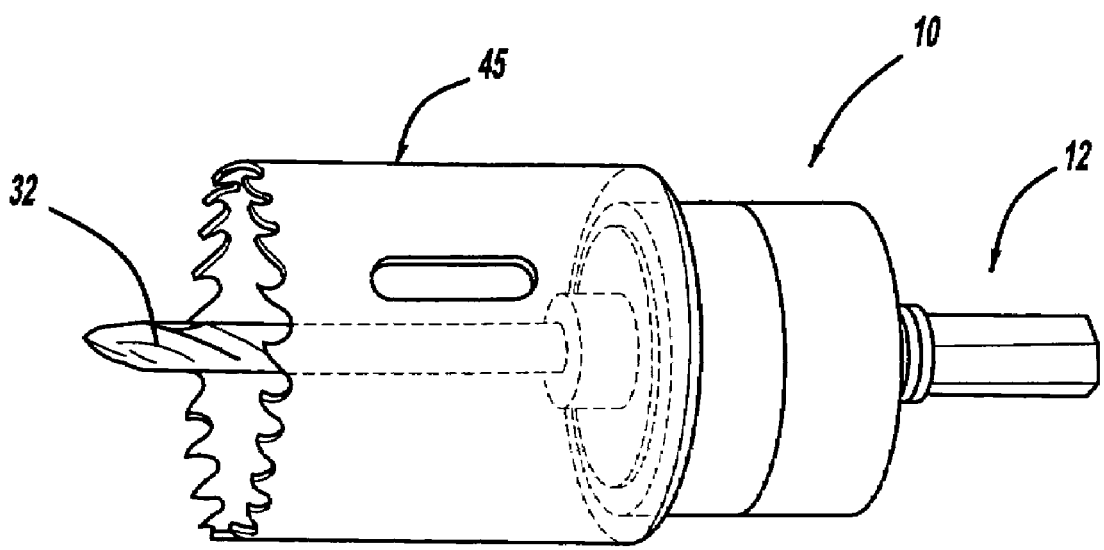
FIG. 1 is a perspective view of a holesaw mandrel assembly with an attached holesaw.

The following description is merely exemplary in nature and is not intended to limit the present disclosure, application, or uses.

Turning to the figures, a holesaw mandrel assembly is illustrated and designed with the reference numeral 10. The holesaw mandrel assembly 10 includes a mandrel 12, a first axially movable member 14 and a mechanism 16 for moving the first member 14 between a first and second position.

The mandrel 12 includes a body 18 with a first projecting end 20 and a second extending end 22. The first projecting end 20 is cylindrical and may have an outer polygonal surface to connect the mandrel with a rotating tool, such as a drill. The body 18 has an overall cylindrical shape with a first cylindrical portion 24 and a larger cylindrical shaped portion 26. The first cylindrical portion 24 includes an aperture 28 to receive a fastener 30 which retains a pilot drill bit 32 in a bore 34. The drill bit 32 extends through the second extending member 22. The second cylindrical portion 26 includes a peripheral groove 36 which receives a sealing O-ring 38.

The second extending end 22 of the mandrel 12 includes a first cylindrical portion 40 and a threaded spud 42. The threaded spud 42 receives a holesaw 45 in a conventional manner. The first cylindrical portion 40 includes a pair of flat surfaces 46 which receive the first member 14. The surfaces 46 mate with surfaces in the first member 14 to enable the first member 14 to axially slide on the second extending end 22 of the mandrel 12. However, the flat surfaces 46 fix the first member 14 against rotation about the second extending end 22 of the mandrel 12.

The first member 14 has an overall annular configuration. The first member 14 includes a bore 48 which extends through the first member 14. The bore 48 enables the first member 14 to be positioned onto the second end 22 of the mandrel 12. The first member 14 includes a pair of cylindrical portions 50 and 52. The first cylindrical portion 50 extends from the second cylindrical portion 52. A shoulder 54 is formed between the two portions 50, 52. The bore 48, extending through the first portion 50, has a substantially circular configuration. The bore 48 in the second cylindrical portion 52 includes a pair of flat surfaces 56. The flat surfaces 56 mate with the flat surfaces 46 of the second end 22 of the mandrel 12. Thus, the pair of flat surfaces 46, 56 prohibits rotation of the first member 14 on the second end 22 of the mandrel 12.

The second cylindrical portion 52 includes a circumferential groove 58 which receives a sealing O-ring 60. The cylindrical portion 52 includes a plurality of extending legs 62. A plurality of channels 64 are formed between the legs 62.

The mechanism 16 for moving the first member 14 between a first and second position includes a cover or collar 66. The cover 66 has an overall cylindrical shape with a central bore 68. The collar 66 includes a lip 70, at one end, which rests on shoulder 54 to retain the first member and mechanism 16 on the mandrel 12. The collar 66 includes an internal cylindrical surface 72 which defines the bore 68. The internal surface 72 includes a portion 74 which includes flat surfaces 76 which define a polygonal shape, such as a hex, when viewed in axial cross-section, to key with a hex washer 78 and cage 80. Also, the interior surface includes a channel 82 which receives a C-clip 84. The C-clip 84 is positioned behind the second cylindrical body portion 26 to retain the first member 14 and mechanism 16 onto the mandrel 12.

The hex washer 78 includes a central bore 86, with a circular configuration, that fits onto the cylindrical portion 40 of the second end 22 of the mandrel 12. The hex washer 78 includes flat surfaces 88 around its periphery which defines a hex surface. The hex surface enables the hex washer 78 to key with the collar 66 for rotation with the collar 66 about the second end 22.

A thrust bearing 90 and washer 92 are positioned below the hex washer 78. The washer 92 abuts the cylindrical portion 26 of the mandrel body. The thrust bearing 90 may be of the needle roller ball, or the like, bearing. Also, a thrust bearing made of a low friction material such as TEFLON™ may be used. The thrust bearing 90 provides for a substantially friction free rotation of the hex washer 78.

The cage 80 includes an annular body 94. The annular body 94 includes a central bore 96, with a circular configuration, that fits onto the cylindrical portion 40 of the second end 22 of the mandrel 12. The annular body 94 includes an outer peripheral surface which includes a plurality of flat surfaces 98 which correspond to the flat surfaces 88 of the hex washer 78. Thus, the cage 80 is also keyed with the collar 66 for rotation with the collar about the second end 22 of the mandrel 12. The annular body 94 includes a plurality of extending fingers 100 to maintain a plurality of rollers in position between the first member 14 and the cage 80 and hex washer 78.

Figure 2:
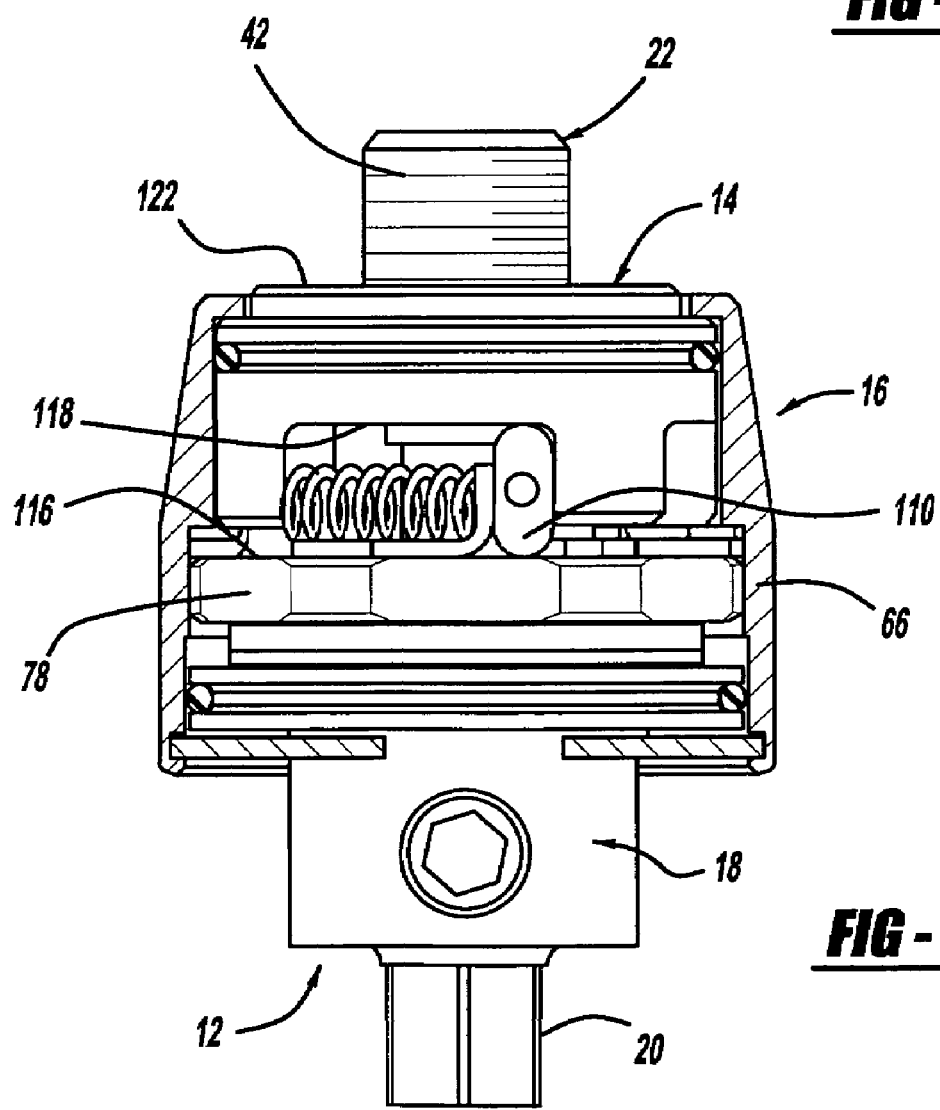
FIG. 2 is a partial cross-section view of a holesaw assembly of FIG. 1.
Figure 3:
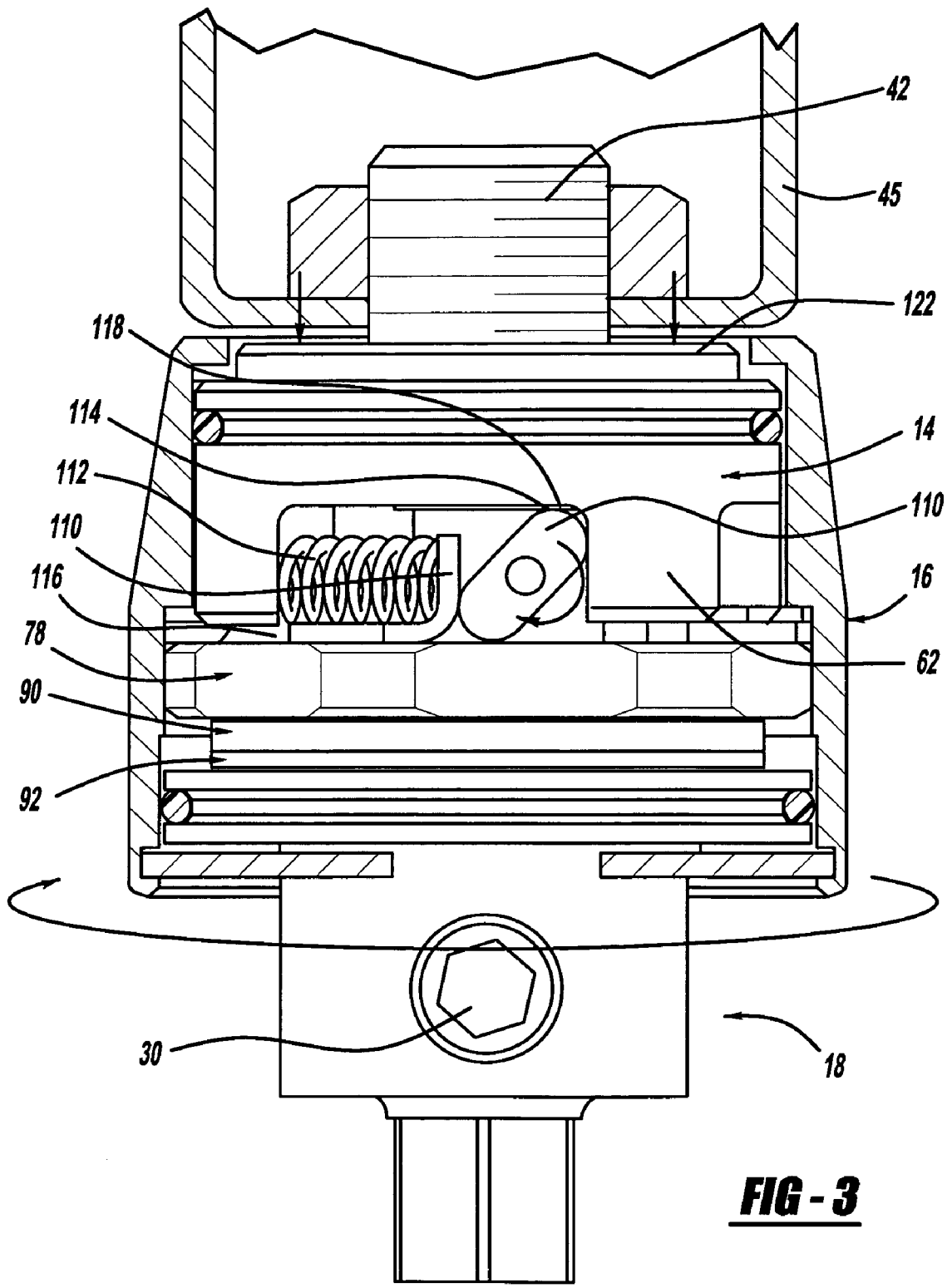
FIG. 3 is the same view as FIG. 2 with the assembly in a second position.
Figure 4:
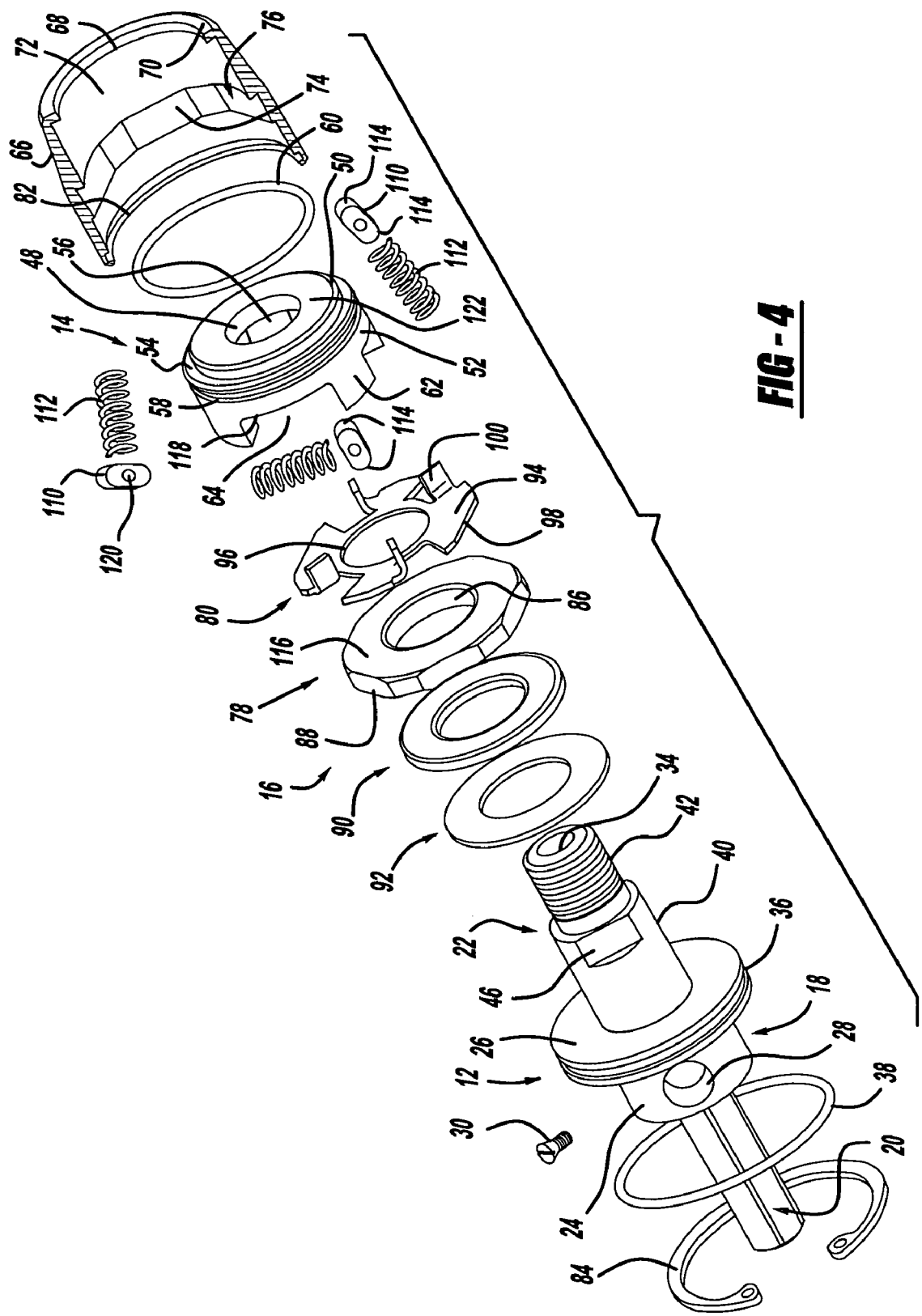
FIG. 4 is an exploded view of the holesaw mandrel assembly of FIG. 1.

A plurality of rollers or pins 110, preferably three, is positioned between the cage fingers 100 and the first member legs 62, as best seen in FIGS. 2 and 3. The rollers 110 are sandwiched between the legs 62 and the fingers 100. A biasing member 112, such as a helical spring, is positioned in the channel 64 to hold the fingers 100 against the rollers 110 and to return the first member 14 from a second position (FIG. 3) to its first original position (FIG. 2).

The rollers or pins 110 are manufactured from metallic material to have a hardness like that of a roller bearing. The roller pins 110 include substantially cylindrical or spherical surfaces 114 on their ends. The surfaces 114 are positioned against a bearing surface 116, on the hex washer 78, and a bearing surface 118, on the cylindrical portion 52 of the first member 14. Also, the roller pins 110 include a nub 120 which may be utilized to index the roller pin within the collar 66.

The first member 14 and rotational mechanism 16 are positioned onto the mandrel 12 as illustrated in FIGS. 2 and 3. The rollers 110, in a first position, are substantially vertically positioned between the first member 14 and the hex washer 78. At this time, a holesaw 45 is screwed onto the mandrel threaded spud 42. The holesaw 45 is screwed onto the spud 42 until it contacts the friction surface 122 of the first member 14. This is illustrated in FIG. 2. The holesaw 45 and mandrel assembly 10 are now ready for use. After using the holesaw 45, the holesaw 45 may be quickly removed from the mandrel assembly 10. Due to rotation of the mandrel and the reverse torque caused between the holesaw 45 and the workpiece, there is a tendency for the holesaw 45 to tighten against the friction face 122 of the first member 14.

Once the holesaw 45 is used, and in order to remove it from the mandrel assembly 10, the collar 66 is rotated with respect to the mandrel body 18. As the collar 66 is rotated, the hex washer 78 as well as the cage 80 are rotated with the collar 66. As this occurs, the roller surfaces 114 roll along friction surfaces 116 and 118 of the hex washer 78 and cylindrical portion 52, respectively, as illustrated in FIG. 3. Also, the springs 112 are compressed and the first member 14 moves axially along the mandrel second end 22 away from the holesaw 45 toward the second cylindrical portion 26 of the mandrel body 18. As this happens, the friction face 122 moves away from the holesaw 45. Thus, the holesaw 45 can be easily rotated and removed from the threaded spud 42. Thus, wrenches or tools are not required to remove the holesaw 45 from the mandrel assembly 10.

After the holesaw is removed and the rotational force on the collar 66 is released, the helical springs 112 expand to their original condition in the channels 64 to force the rollers 110 back into their original position. Thus, the mandrel assembly 10 is ready for additional use.

Turning to FIGS. 5 and 6, an additional embodiment is illustrated. The mandrel assembly 210 includes a mandrel 212, first member 214, and a rotation mechanism 216.

The mandrel 212 includes a first extending portion 220, which acts as a shank, and a second extending portion 222. The second extending portion 222 includes a threaded spud 242 with a bore 234 extending through it. Also, the mandrel includes a body 224.

The first member 214 has an overall cylindrical body 250 with an extending skirt 252. The skirt includes a plurality of apertures 254. The first member 214 is rotatable around the second end 222 of the mandrel 212. The rotation mechanism 216 includes a collar 260 and dog bone rollers 262. The collar 260 includes a mechanism 269 to mate with a channel 266 in the first member 214 to rotate the first member 214 while rotating the collar 260.

The dog bone roller 262 includes a pair of heads 268 which have a roller surface 270 like surfaces 114 above. Also, a neck portion 274 connects the two heads 268 together. The neck portion 274 has a thickness less than the thickness of the two heads 268. In a first position, the dog bone roller 262 is in a vertical position. Thus, the holesaw 45 can be positioned onto the first member 214 and frictionally tightened against its friction surface. To remove the holesaw 45 from the mandrel assembly 210, the collar 260 is rotated which, in turn, rotates the first member 214 along the roller heads 268 in apertures 276, 278 in the first member 214 and the body 224. As this occurs, the dog bone rollers 262 becomes angled with respect to vertical (FIG. 6) which, in turn, draws the first member 214 axially toward the body 224 of the mandrel 212, as illustrated in FIG. 6. Thus, the holesaw 45 can be easily removed from the threaded spud.

Turning to FIGS. 7 and 8, an additional embodiment of a hole saw mandrel assembly 310 is illustrated. This embodiment is similar to the second embodiment mentioned above.

The mandrel 312 includes a first end shanking portion 320. The body 318 is hollow and receives a rotatable second end 322. The second end 322 includes a threaded spud 332 as well as a bore 334 extending entirely through the second end 322. The second end 322 has an overall cylindrical configuration and may include a thrust bearing member positioned in a bore 346 in the body 318. This enables the second end 322 to rotate a desired amount with respect to the body 318. Preferably, the second end 322, as well as the spud 332 is enabled to rotate between 15° and 25°.

The first member 314 is substantially the same as that identified in the previous embodiment. However, the spring skirt 315 includes a bore which receives an axially acting spring 330. The springs 330 enhance the return of the first member 314 to its original position.

The rotation member 316 includes a collar 360, dog bone rollers 362 and a dog bone spring seat 380. The dog bone spring seat 380 includes notches 382 which mesh with fingers 384, which extend from the mandrel body 318. The mating fingers 384 and notches 382 fixedly position the dog bone spring seat 380 onto the body 318. The dog bone spring seat 380 includes apertures 386 that receive heads 368 of the dog bone rollers 362. The spring seat 380 also includes a bore 390 that receive springs 392 to enhance the return of the first member 314 to its original position. The dog bone rollers 362 function in the same manner as discussed above. Thus, as the first member 314 is rotated by the collar 360, the dog bone rollers 362 rotate in the apertures and move from a vertical position to an angled position. As this occurs, the first member moves away from the holesaw 45 and moves the first member towards the dog bone spring seat 380. This enables the holesaw 45 to be removed from the spud 332.

Figure 9:
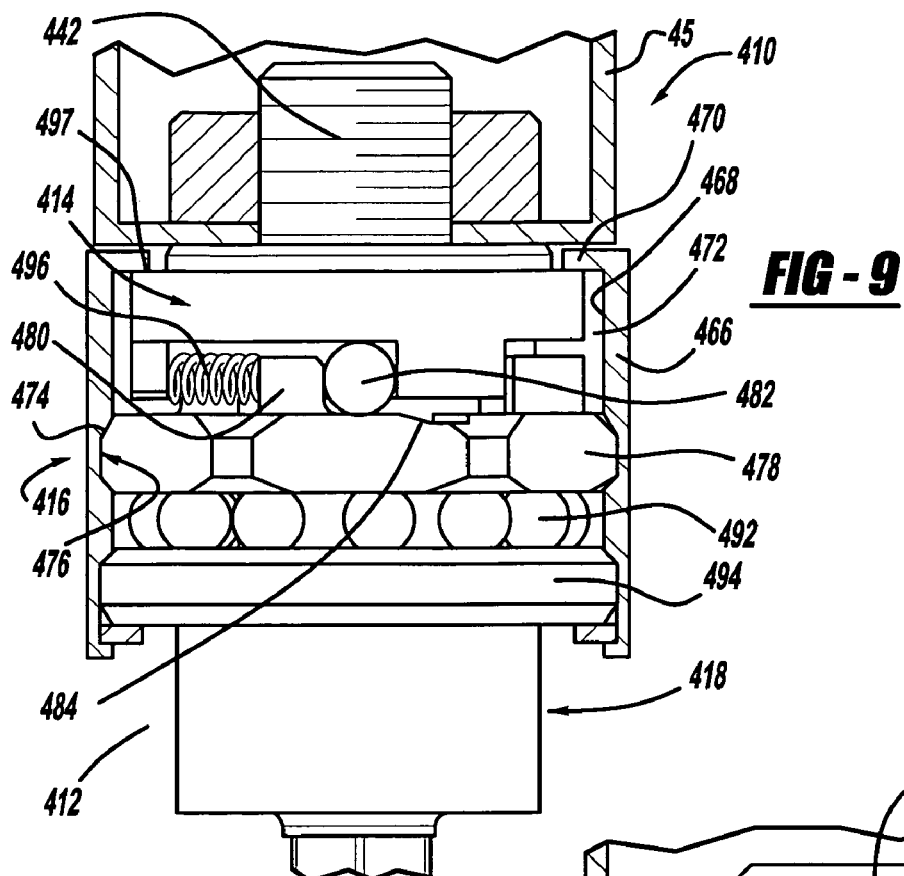
FIG. 9 is a cross-section view of an additional embodiment of the holesaw mandrel assembly.
Figure 10:
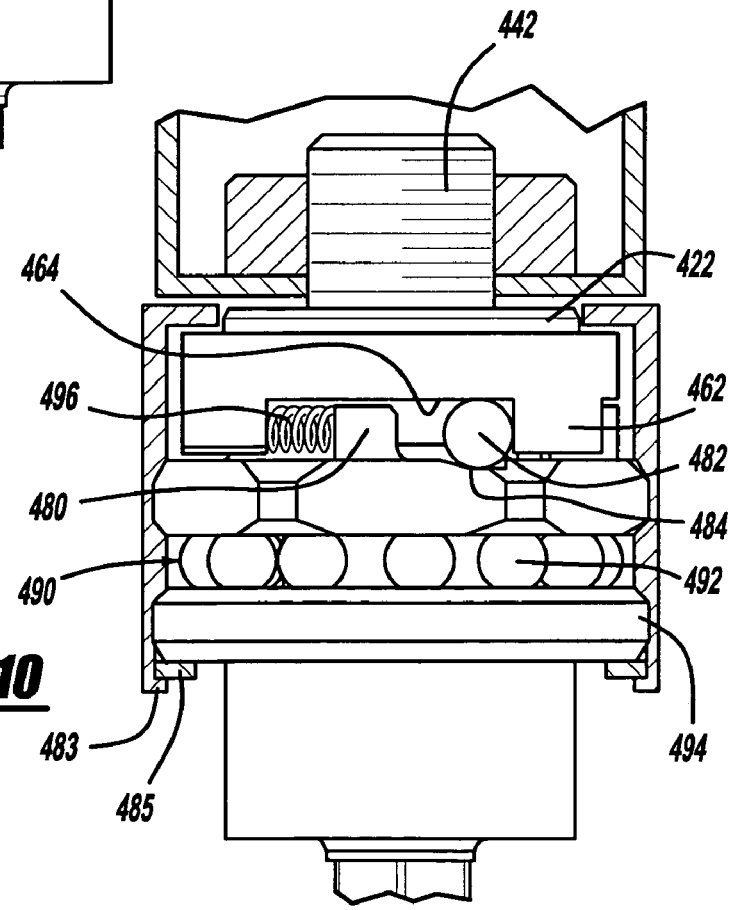
FIG. 10 is a view like FIG. 9 in a second position.
Figure 13:
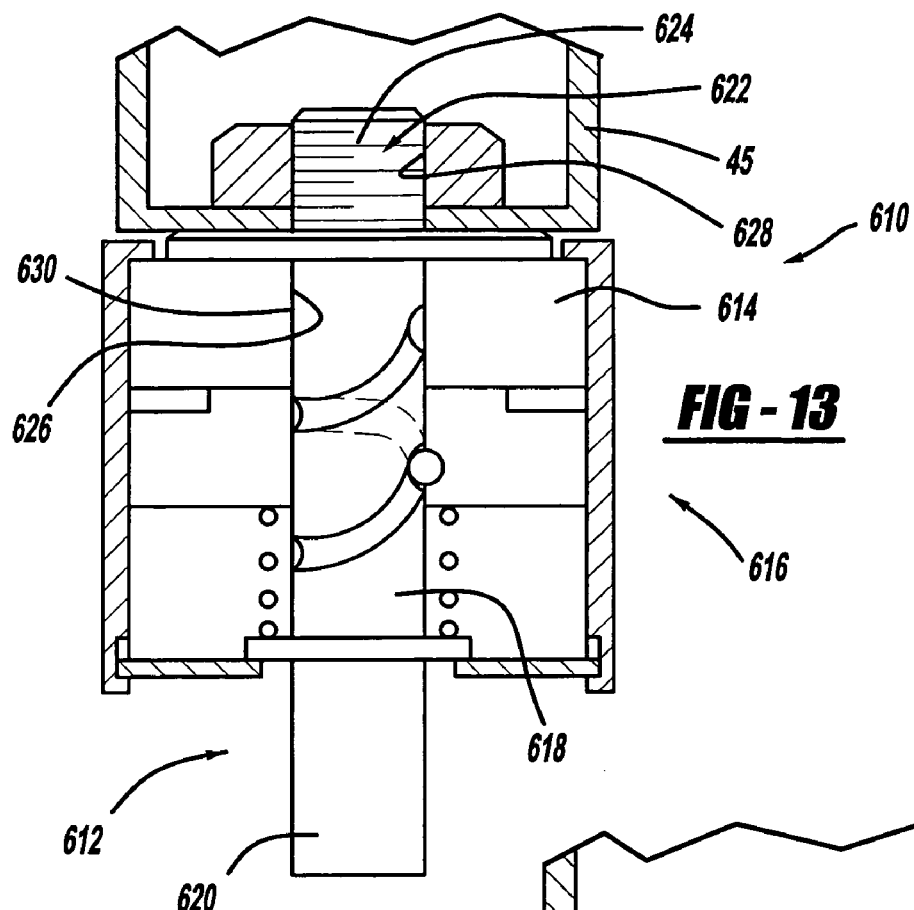
FIG. 13 is a cross-section view of an additional embodiment of the holesaw mandrel assembly.
Figure 14:
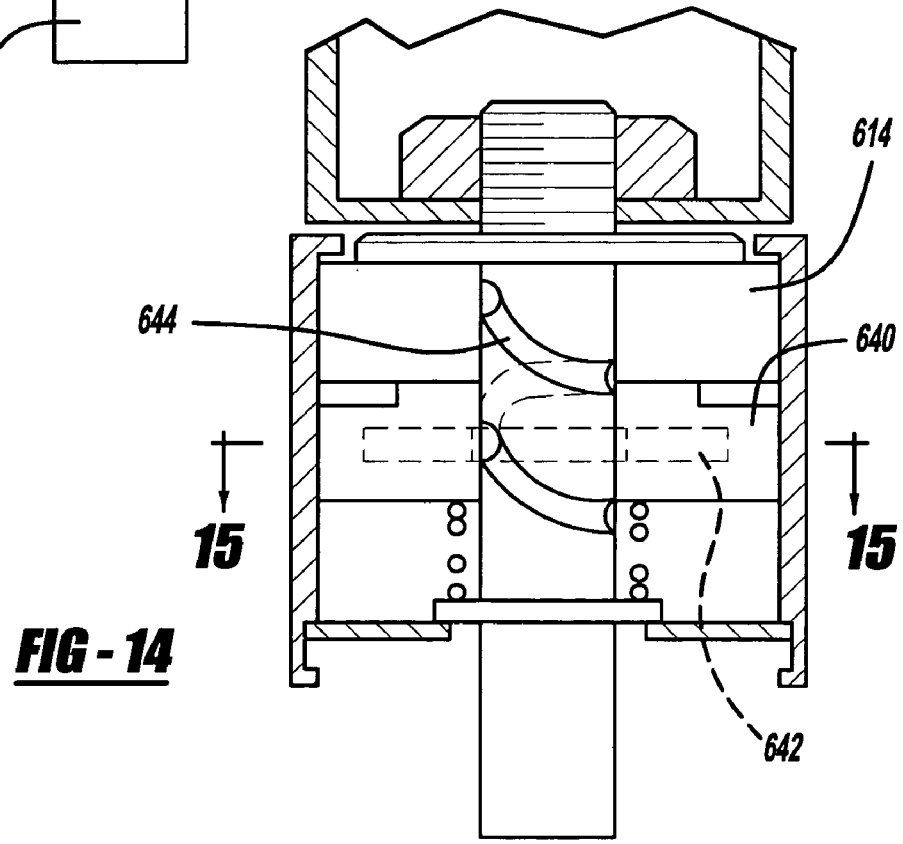
FIG. 14 is a view like FIG. 13 in a second position.
Figure 15:
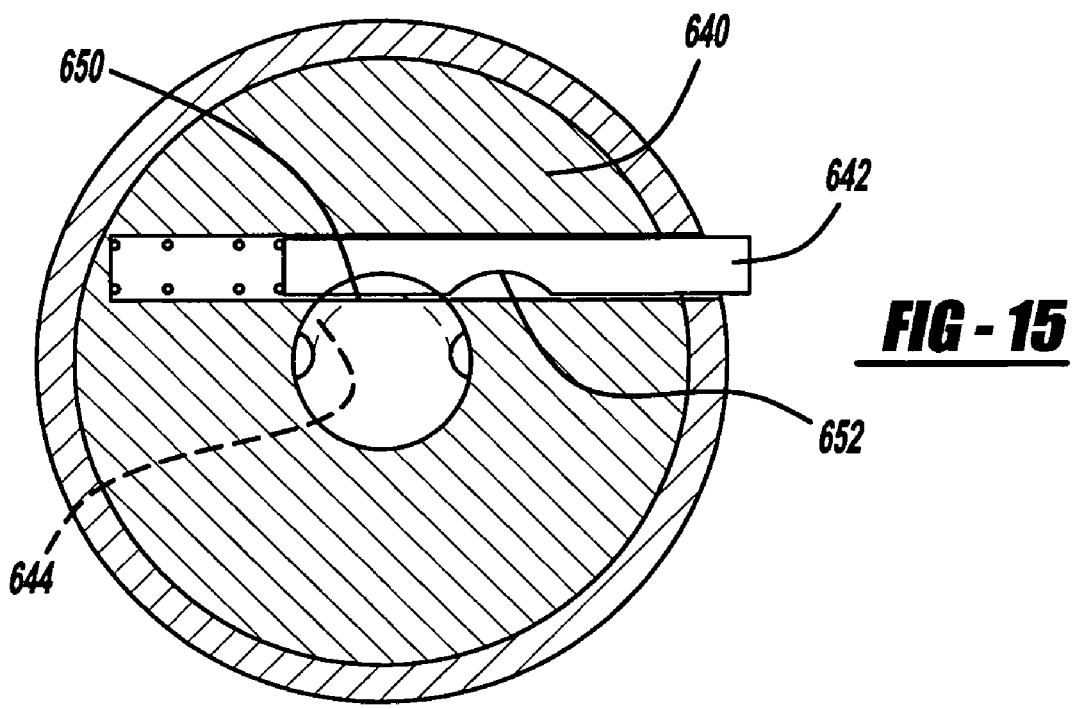
FIG. 15 is a cross-section view of FIG. 13 along line 15-15 thereof.
Figure 16:
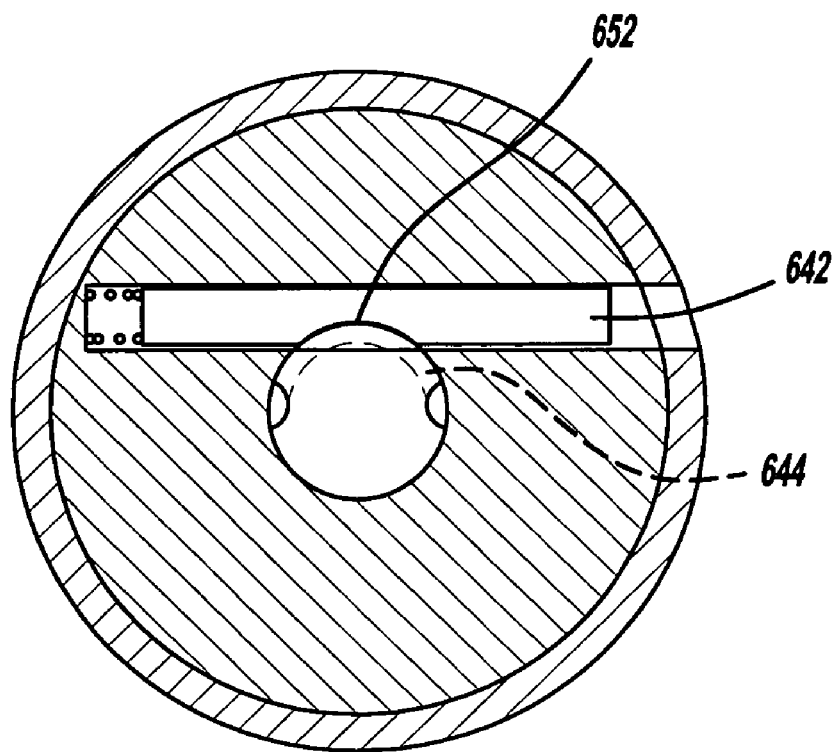
FIG. 16 is a view like FIG. 15 with the pin in an activated position.

FIGS. 9 and 10 illustrate an additional embodiment. The mandrel assembly 410 includes a mandrel 412, an axially movable member 414 and a mechanism 416 for moving the first member 414 between a first and second position.

The mandrel 412 is substantially similar to that of FIG. 1 and the same reference numerals will be used increased by 400. Likewise, the first member 414 is substantially the same as the first member of FIG. 1 and includes the same reference numerals increased by 400.

The moving mechanism 416 for moving the first member 414 between the first and second position includes a cover or collar 466. The cover 466 has an overall cylindrical shape with a central bore 468. The collar 466 includes a lip 470, at one end, which rests on shoulder 454 to retain the first member 414 and mechanism 416 on the mandrel 412. The collar 466 includes an internal surface 472 which defines the bore 466. The internal surface 472 includes a portion 474 which includes flat surfaces 476 which define a polygonal shape, such as a hex, when viewed in axial cross-section to key with a hex washer 478. Also, the interior surface includes a channel 483 which receives a C-clip 485. The C-clip 485 is positioned behind the washer 494 to retain the first member 414 and moving mechanism 416 onto the mandrel.

The hex washer 478 is substantially identical to that previously described; however, it includes integral fingers 480. The finger 480 retain the rollers 482 between the legs 462 and finger 480. Also, the hex washer 478 includes a groove 484. The groove 484 receives the rollers 482 when the first member 412 is moved into its second position.

A thrust bearing 490, including roller balls 492, is positioned between the hex washer 478 and the washer 494. The thrust bearing 490 provides for a substantially friction free rotation of the hex washer 478. A biasing member 496, like biasing members 112, are positioned in the channels 464 to return the first member 414 to its original position.

The mandrel assembly 410 operates substantially the same as the mandrel assembly 10. Here, as the cover 466 is rotated, the rollers 482 roll into grooves 484. As this occurs, the first member 414 moves axially downward along the second end of the mandrel. This enables removal of the holesaw 45 from the spud 442. As the force is released off of the collar 466, the springs 496, biasing between the fingers 480 and legs 462, return the first member 414 to its original position.

Turning to FIGS. 11 and 12, an additional embodiment is shown. Here, the mandrel assembly 510 includes a mandrel 512, a first member 514, and a mechanism 516 for moving the first member 514 between its first and second positions.

The mandrel 512 includes a body 518, a shanking end 520 and a second extending end 522 which includes a threaded spud 524. The body 518 includes a first cylindrical portion 526 continuous with the shank portion 520 and an enlarged cylindrical portion 528 adjacent the spud 524.

The first member 514 includes a friction face 530 which abuts the holesaw 45. The first member 514 is axially movable and rotationally fixed onto the second extending portion 522.

The moving mechanism 516 for moving the first member 514 includes a collar 532 and at least one and preferably a plurality of pawls 534. The collar 532 is biased about the body first cylindrical portion 516. The collar includes bores 536 to receive legs 538 of the pawls 534. The pawls 534 are pivotally secured in apertures 540 in the second cylindrical portion 528 of the body 518. The pawls 534 include an eccentric portion 542. Also, the first cylindrical portion 526 includes cut-outs 544 to receive the legs of the pawls 534.

In operation, the eccentric portion 542 of the pawls contacts the underside of the first member 514. Accordingly, a holesaw 45 is secured at this time. In order to move the pawls 534 from a first position to a second position after use of the holesaw, the collar 532 is pulled away from the first member 514. As this occurs, the legs 538 of the pawls 534 are removed from the apertures 544 so that the pawls 534 rotate in the apertures 540 of the second cylindrical portion 528 of the body 518. As this occurs, the eccentric portion 542 moves away from the first member 514 and rotates in the apertures 540. Since the heads of the pawls 534 are like a cam with an eccentric surface, they roll in the apertures 540. Thus, the eccentric portion 542 roll out of contact with the first member 514 enabling it to move toward the second cylindrical portion 528 of the body 518. At this time, the holesaw 45 is spaced from the first member 514 and can easily be removed. The spring 550 returns the collar 532 as well as the pawls 534 to their original position.

Turning to FIGS. 13-16, an additional mandrel assembly 610 is illustrated. The mandrel assembly 610 includes a mandrel 612, a first member 614, and a mechanism 616 for moving the first member 614 between a first and second position. The mandrel includes a body 618 with an extending shaft portion 620 and a second extending portion 622. The second extending portion 622 includes a threaded spud 624. Also, the second extending portion includes flat surfaces 626 to prohibit rotation of the first member 614 on the second extending member 622.

The first member 614 has an annular shape with a bore 628. The bore 628 has flat surfaces 630 which mate with flat surfaces 626 so that the first member 614 is axially movable along the second extending member 622 but rotationally fixed to it.

The moving mechanism 616 includes an annular member 640 and an actuating member 642. A helix 644 is formed on the body 618 of the mandrel 612. The annular member 640 includes a circular shape bore 646 which enables the annular member 640 to rotate on the mandrel body 618. The actuator pin 642 is mounted in a bore in the annular member 640. The actuator pin 642 is biased in the annular member 640 so that it moves between a first and second position. In the first position, a portion of the pin 650 is in contact in the helical groove 644 of the body 618. When this occurs, the annular member 640 abuts the first member 614. The annular member 640 is stationarily positioned in an axially direction. As the actuator pin 642 is moved to a second position, a cutout 652 in the pin 642 mates with the helical groove 644 of the cylindrical body 618. This enables the annular member 640 to be rotated away from the first member 614 and the holesaw 45. As this occurs, the first member 614, resting on the annular member 640, travels with the second member 616 away from the holesaw 45. Thus, the holesaw 45 can be easily removed from the mandrel assembly at this time.

The description of the invention is merely exemplary in nature and, thus, variations that do not depart from the gist of the invention are intended to be within the scope of the invention. Such variations are not to be regarded as a departure from the spirit and scope of the disclosure.

What is claimed is:

1. A holesaw mandrel assembly comprising:
   a mandrel having a body with a first end for coupling with a drill motor, a second end extending from said body, said second end including a thread for receiving a holesaw, the mandrel having an axis of rotation;
   a first member on said second end, said first member axially movable on said second end;
   a friction surface on said first member, said friction surface adapted for contacting a base surface on the holesaw such that the holesaw is fixed in position, said friction surface moving between a first contact and a second release position; and
   a mechanism on said mandrel adjacent said first member for moving said friction surface between said first and second positions, said mechanism including at least one roller, said roller providing a bearing surface in continuous contact with said first member such that as said roller moves between a first and second roller position the bearing surface provides a force directly on the first member and having at least a component in the direction of said axis of rotation, and, said friction surface moves between said contact and release positions.

2. The mandrel assembly according to claim 1, wherein said first member is biased to return to its first position from its second position.

3. The mandrel assembly according to claim 1, wherein said mechanism further comprises a second member rotatable on said second end, said second member providing a bearing surface.

4. The mandrel assembly according to claim 3, further comprising at least one roller positioned between said first and second member, said roller on said bearing surface.

5. The mandrel assembly according to claim 4, wherein said roller having an elongated body defining an axis with a substantially cylindrical surface resting on said bearing surface wherein rotation of said first or second member moves said roller such that said roller moves from a position wherein said body axis is substantially parallel to an axis of said bore to a position wherein said axis is angled with respect to said bore axis which in turn moves said first member between said first and second positions.

6. The mandrel assembly according to claim 1, wherein said mechanism includes at least one seal.

7. The mandrel assembly according to claim 4, wherein said mechanism further comprises a cage for maintaining said at least one roller in position.

8. The mandrel assembly according to claim 5, wherein said roller has a dog bone shape.

9. The mandrel assembly according to claim 4, wherein said at least one roller is a ball, and said bearing surface has at least one groove.

10. The mandrel assembly according to claim 1, wherein said first member includes a member for rotationally fixing said first member on said second end.

11. A holesaw mandrel assembly comprising:
    a mandrel having a body with a first end for coupling with a drill motor, a second end extending from said body, said second end including a thread for receiving a holesaw, the mandrel having an axis of rotation;
    a first member on said second end, said first member axially movable on said second end;
    a second member on said second end, said second member rotatable on said second end, said second member providing a contact surface;
    at least one roller extending between said first member and said second member, said at least one roller providing a bearing surface in continuous contact with said second member contact surface and said first member, said at least one roller moving between a first and second position for enabling said first member to move axially along said second end the bearing surface providing a force directly on the first member and having at least a component in the direction of said axis of rotation, wherein when said at least one roller is in its first position, said first member is fixed so that a holesaw may be screwed onto said thread and abut said first member securing said holesaw in a use position on said first member and when said at least one roller is moved into its second position, said first member moves axially away from the holesaw enabling said the holesaw to be easily removed from said thread.

12. The holesaw mandrel assembly according to claim 11, further comprising a bearing member adjacent said second member for providing a substantially friction free rotation of said second member.

13. The holesaw mandrel assembly according to claim 11, further comprising a first biasing mechanism for moving said at least one roller from said second to said first position.

14. The holesaw mandrel assembly according to claim 11, further comprising a cover member rotatable on said second end and keyed for rotation with said second member.

15. The holesaw mandrel assembly according to claim 13, further comprising a cage member for retaining said biasing mechanism.

16. The holesaw mandrel assembly according to claim 15, wherein said cage includes an extending finger and said first member includes a projecting finger forming a channel for receiving said biasing mechanism.

17. The holesaw mandrel assembly according to claim 11, wherein said at least one roller has a dog bone shape.

18. A holesaw mandrel assembly comprising:
    a mandrel having a body with a first end for coupling with a drill motor, a second end extending from said body, said second end including a thread for receiving a holesaw, the mandrel having an axis of rotation;
    a first member on said second end, said first member axially movable on said second end;
    a second member on said body, said second member providing a contact surface;
    at least one roller extending between said first member and said second member, said at least one roller providing a bearing surface in continuous contact with said second member contact surface and in contact with said first member, said at least one roller moving between a first and second position for enabling said first member to move axially along said second end the bearing surface providing a force directly on the first member and having at least a component in the direction of said axis of rotation, wherein when said at least one roller is in its first position, said first member is fixed so that a holesaw may be screwed onto said thread and abut said first member securing said holesaw in a use position on said first member and when said at least one roller is moved into its second position, said first member moves axially away from the holesaw enabling said the holesaw to be easily removed from said thread.

19. The holesaw mandrel assembly according to claim 18, wherein said mandrel second end rotates with respect to said mandrel body.

20. The holesaw mandrel assembly according to claim 18, wherein said first member rotates with respect to said mandrel second end.

21. The holesaw mandrel assembly according to claim 18, wherein said at least one roller is dog bone shaped.

22. The holesaw mandrel assembly comprising:
a mandrel having a body with a first end for coupling with a drill motor, a second end extending from said body, said second end including a thread for receiving a holesaw, the mandrel having an axis of rotation;
a first member on said second end, said first member axially movable on said second end;
a second member axially movable on said mandrel body; and
at least one roller extending between said first member and said second member, said at least one roller in contact with said second member contact surface, said at least one roller moving between a first and second position for enabling said first member to move axially along said second end the bearing surface providing a force directly on the first member and having at least a component in the direction of said axis of rotation, wherein when said at least one roller is in its first position, said first member is fixed so that a holesaw may be screwed onto said thread and abut said first member securing said holesaw in a use position on said first member and when said at least one roller is moved into its second position, said first member moves axially away from the holesaw enabling said the holesaw to be easily removed from said thread.

23. The holesaw mandrel assembly according to claim 22, wherein said at least one roller being a pawl with a head and leg, said head including an eccentric cam surface.

24. The holesaw mandrel assembly according to claim 22, wherein said mandrel body includes cutouts for receiving said legs of said pawls.

25. The holesaw mandrel assembly according to claim 22, wherein said mandrel body includes apertures for receiving said pawl heads.

26. A holesaw mandrel assembly comprising:
a mandrel having a body with a first end for coupling with a drill motor, a second end extending from said body, said second end including a thread for receiving a holesaw;
a first member on said second end, said first member axially movable on said second end;
a second member axially movable on said mandrel body;
a groove in said mandrel body;
a pin mounted on said second member, said pin engaging said mandrel groove, said pin movable between a first and second position for enabling said first member to move axially along said second end wherein when said pin is in its first position in said groove said first member is fixed so that the holesaw may be screwed onto said thread and tighten on said first member securing said holesaw in a use position on said first member and when said pin is moved to its second position in said groove, said first and second members move axially away from the holesaw enabling the holesaw to be easily removed from said thread.

27. The holesaw mandrel assembly according to claim 26, wherein said pin includes a cut out portion.

28. The holesaw mandrel assembly according to claim 26, wherein said pin is biased in said second member.

* * * * *